(12) United States Patent
Moore et al.

(10) Patent No.: US 7,247,242 B1
(45) Date of Patent: Jul. 24, 2007

(54) ARSENIC REMOVAL FROM WATER

(75) Inventors: Robert C. Moore, Edgewood, NM (US); D. Richard Anderson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 134 days.

(21) Appl. No.: 10/039,947

(22) Filed: Oct. 25, 2001

Related U.S. Application Data

(60) Provisional application No. 60/328,536, filed on Oct. 10, 2001.

(51) Int. Cl.
*C02F 1/28* (2006.01)

(52) U.S. Cl. ............... 210/662; 210/668; 210/670; 210/679; 210/695; 210/712; 210/717; 210/911

(58) Field of Classification Search .............. 210/660, 210/662, 663, 668, 679, 712, 717, 911, 670, 210/695
See application file for complete search history.

(56) References Cited

U.S. PATENT DOCUMENTS

| | | | | |
|---|---|---|---|---|
| 2,340,111 | A * | 1/1944 | Alelio | 210/679 |
| 4,201,667 | A | 5/1980 | Liao | 210/50 |
| 4,366,128 | A | 12/1982 | Weir et al. | 423/87 |
| 4,566,975 | A | 1/1986 | Allgulin | 210/711 |
| 4,935,146 | A | 6/1990 | O'Neill et al. | 210/684 |
| 5,114,592 | A * | 5/1992 | Schuster et al. | 210/667 |
| 5,120,447 | A | 6/1992 | Christian | 210/714 |
| 5,378,366 | A | 1/1995 | Yen | 210/667 |
| 5,603,838 | A | 2/1997 | Misra et al. | 210/665 |
| 5,840,194 | A | 11/1998 | Yokose et al. | 210/710 |
| 6,030,537 | A | 2/2000 | Shaniuk et al. | 210/683 |
| 6,039,789 | A | 3/2000 | McMullen et al. | 75/711 |
| 6,096,223 | A | 8/2000 | El-Shoubary et al. | 210/720 |
| 6,254,783 | B1 | 7/2001 | Wurzburger et al. | 210/724 |
| 6,656,587 | B2 * | 12/2003 | Johnson et al. | 428/402 |
| 6,790,363 | B2 * | 9/2004 | Vempati | 210/668 |
| 6,802,980 | B1 * | 10/2004 | Khandaker et al. | 210/724 |

OTHER PUBLICATIONS

M. Z. Galbacs & G. Galbacs "International Conference on Arsenic in Groud Water: Cause, Effect and Remedy" Feb. 6-8, 1995.

M. Z. Galbacs & G. Galbacs, "Removal of the Arsenic Content of Drinking Water", May 30-Jun. 2, 1994.

E. Andres & Istvan Balogh "Selected abstracts of the 4th Hungarian Magnesium Symposium Balatonszeplak", Sep. 1992 vol. 5 No. 3.

(Continued)

*Primary Examiner*—Matthew O. Savage
(74) *Attorney, Agent, or Firm*—Robert D. Watson

(57) ABSTRACT

Methods for removing arsenic from water by addition of inexpensive and commonly available magnesium oxide, magnesium hydroxide, calcium oxide, or calcium hydroxide to the water. The hydroxide has a strong chemical affinity for arsenic and rapidly adsorbs arsenic, even in the presence of carbonate in the water. Simple and commercially available mechanical methods for removal of magnesium hydroxide particles with adsorbed arsenic from drinking water can be used, including filtration, dissolved air flotation, vortex separation, or centrifugal separation. A method for continuous removal of arsenic from water is provided. Also provided is a method for concentrating arsenic in a water sample to facilitate quantification of arsenic, by means of magnesium or calcium hydroxide adsorption.

58 Claims, 1 Drawing Sheet

OTHER PUBLICATIONS

Sandor A. Kiss "Selected Abstacts of the Romanian-Hungarian Joint Meeting", Odorheiu-Secviesc, Dec. 1993 vol. 6 No. 4.

Gabor Galbacs & Zoltan Galbacs, "Use of Mg (OH)$_2$ for Preconcentration of Metal Traces in Water" Jun. 27-29, 1994.

Dr. Galbaca Zoltan, "Removal of Heavy Metals and Phosphate from Drinking Water by Adsorption Methods", 1995.

M. Z. Galbacs & G. Galbcas, "Removal of the Arsenic Content of Drinking Water".

Zoltan Galbacs, "Experts' Opinions, Recommendations and Future Planning for Groundwater Problem of West Bengal", May 1995.

G. Galbaca, J. Salamon, Z. Galbacs "Use of Magnesium and Aluminum Compounds for Water Cleaning", Jul. 1995.

Galbaca, Gorgenyi & Kutsan "Ammonia Removal from Sewage Waters by Magnesium Salts" 6$^{th}$ European Magnesium Congress, Budapest, Majus 13-16, 1998.

Galbacs, Bohus Galbacs & Biro Vizvizsgalatok Szegeden "Research of Artesian Wells in Szeged" Proc. The 34d Syposium on Analytical and Environmental Problems, SZAB, Szeged, 104-Proc. The 3$^{rd}$ Syhmposium on Analytical and Environmental Problems, SZAB, Szeged, 104-111(1998).

Bothe, James V. Jr. and Brown, Paul W., "Arsenic Immobilization by Calcium Arsenate Formation" Environmental Science & Technology/vol. 33. No. 21, 1999 pp. 3806-3811.

Mahuli, S., Agnihotri, R., Chauk, S., Ghosh-Dastidar, A., and Fan, L.-S., Mechanism of Arsenic Sorption by Hydrated Lime, Environmental Science & Technology/vol. 31. No. 11, 1997. pp. 3226-3230.

Dutre, V. and Vandecasteele, C., "Solidification/Stabilisation of Arsenic-Containing Waste: Leach Tests and Behaviour of Arsenic in the Leachate" Waste Management, vol. 15 No. 1 pp. 55-62, 1995.

Robins, Robert G. and Tozawa, Kazuteru, "Arsenic Removal from Gold Processing Waste Waters: the Potential Ineffectiveness of Lime" CIM Bulletin, Apr. 1982 pp. 171-174.

Harper, Thomas R. and Kingham, Neville W. "Removal of Arsenic from Wastewater Using Chemical Precipitation Methods" Water Environment Research, vol. 64, No. 3 pp. 200-203.

McNeill, Laurie S. and Edwards, Mar. "Arsenic Removal During Precipitative Softening", Journal of Environmental Engineering, May 1997 pp. 453-460.

\* cited by examiner

ARSENIC REMOVAL FROM WATER

CROSS-REFERENCE TO RELATED APPLICATIONS

This application claims the benefit of the filing of U.S. Provisional Patent Application Ser. No. 60/328,536, entitled Arsenic Removal from Water, filed Oct. 10, 2001, and the specification thereof is incorporated herein by reference.

GOVERNMENT RIGHTS

The U.S. Government has rights to this invention pursuant to Contract No. DE-AC04-94AL85000 awarded by the U.S. Department of Energy.

BACKGROUND OF THE INVENTION

The present invention relates to methods for removal of arsenic from water, and more specifically from municipal or rural water systems, utilizing magnesium hydroxide or calcium hydroxide as an adsorbent for arsenic. The present invention also relates to a method for concentrating arsenic in a water sample that allows more accurate, easier, and less expensive laboratory quantification of arsenic in water samples.

Arsenic concentrations in drinking water are a subject of significant concern. It is known that high levels of arsenic in drinking water are carcinogens. The acceptable and safe maximum level of arsenic in drinking water is a subject of significant debate. The current applicable regulations of the United States Environmental Improvement Agency set the maximum limits of arsenic at 50 parts per billion (ppb) in drinking water. However, there are regulatory proposals that the maximum arsenic levels be no more than 10 ppb, and it is advocated by some that maximum arsenic levels be as low as 2 ppb.

Water produced by many municipal water systems, particularly in the western United States as well as other locals, typically has arsenic levels up to about 50 ppb and higher, and thus is commonly higher than proposed lower levels for arsenic, and is in some instances higher than currently accepted levels for arsenic. Some purification means must be employed to remove arsenic prior to consumption of the water. The problem is compounded by the presence of minerals, including carbonates, which interfere with many purification schemes and methods. Particularly with water obtained from areas with geologic evidence of volcanic activity, both high arsenic levels and high mineral content, including carbonates, are typical.

There have been a number of methods used to remove arsenic and other heavy metals from water, including primarily reverse osmosis, column purification, and hydroxide precipitation. Many of these processes provide acceptable results only within narrow and restrictive parameters. In addition, many if not most of these processes are costly and comparatively inefficient.

None of the prior art methods meet the requirements of efficient removal of arsenic utilizing commonly and inexpensively available reagents with a minimum of mechanical processing and steps. Thus there is a need for an inexpensive and simple process that specifically removes arsenic from drinking water, such as municipal water systems and rural well systems.

In addition to the treatment of water to remove arsenic, quantitative measurement of arsenic concentration in water at 1-50 ppb levels requires expensive and complex equipment that is not feasible for small and medium-sized municipal water treatment facilities. There is thus a need for a method of concentrating arsenic from less than 50 ppb to much higher concentrations in water, preferably by a factor of at least 10 to 30 times. The concentration of arsenic to a 100 ppb level and above thereby allows less expensive equipment and less complex techniques to be used for arsenic quantification.

Against this background, the present invention was developed.

SUMMARY OF THE INVENTION

The present invention relates to methods for removing arsenic from water by addition of inexpensive and commonly available magnesium oxide, magnesium hydroxide, calcium oxide, or calcium hydroxide to the water. The hydroxide has a strong chemical affinity for arsenic and rapidly adsorbs arsenic, even in the presence of carbonate in the water. Simple and commercially available mechanical methods for removal of magnesium hydroxide particles with adsorbed arsenic from drinking water can be used, including filtration, dissolved air flotation, vortex separation, or centrifugal separation. A method for continuous removal of arsenic from water is provided. Also provided is a method for concentrating arsenic in a water sample to facilitate quantification of arsenic, by means of magnesium or calcium hydroxide adsorption.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
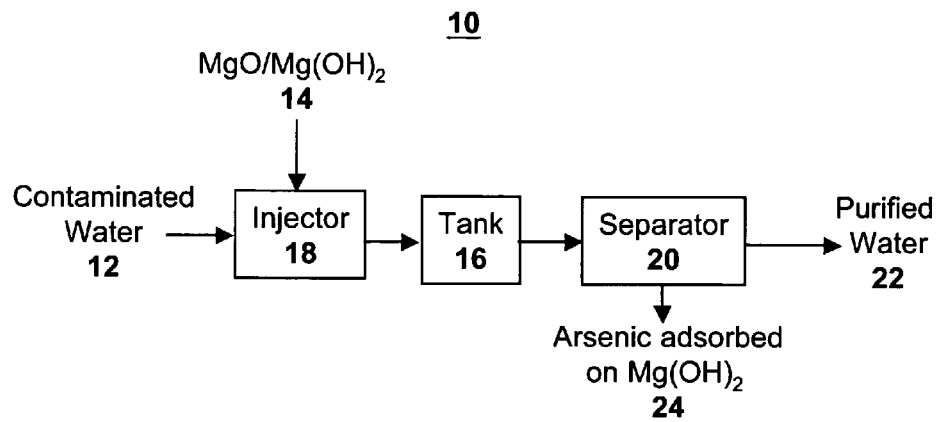
FIG. 1 is a schematic diagram of a process of the invention utilizing MgO or $Mg(OH)_2$ to remove arsenic from water.

The invention provides methods and processes for use of a hydroxide, either directly or through one or more precursors, for removing arsenic from drinking water, including water distribution systems. In one embodiment, magnesium hydroxide, $Mg(OH)_2$ (a strong adsorbent for arsenic) is used to adsorb arsenic. The complex consisting of arsenic adsorbed on $Mg(OH)_2$ is subsequently removed from the water by conventional means, including filtration, settling, skimming, vortexing, centrifugation, magnetic separation, or other well-known separation methods. In another embodiment, magnesium oxide, MgO, is employed, which reacts with water to form $Mg(OH)_2$. The resulting $Mg(OH)_2$ then adsorbs arsenic, as set forth above.

Alternatively, calcium hydroxide, $Ca(OH)_2$, or a precursor such as CaO (which reacts with water to form $Ca(OH)_2$) can be used to adsorb arsenic, which is subsequently removed from the water as set forth above.

The method is preferably conducted using powdered or particulate $Mg(OH)_2$ or MgO, or powdered or particulate CaO or $Ca(OH)_2$.

Carbonate, such as calcium carbonate, $CaCO_3$, is frequently present in water containing high natural arsenic levels. Even tap water can contain significant concentrations of carbonate (e.g., 150 ppm in Albuquerque tap water). If carbonate is present in water, it can adversely affect the adsorption of arsenic from water using a system based on $Mg(OH)_2$ or $Ca(OH)_2$. This is because $Mg(OH)_2$ reacts with carbonate, albeit slowly, to form magnesium carbonate, $MgCO_3$. Unfortunately, $MgCO_3$ does not adsorb arsenic to any significant degree. Furthermore, arsenic adsorbed to $Mg(OH)_2$ is rapidly released back into solution when $Mg(OH)_2$ reacts with carbonate to form $MgCO_3$. Therefore, any process that uses $Mg(OH)_2$ or $MgO$ to remove arsenic from water must take into account the effects of carbonate.

Conventional methods that use a column packed with adsorbents or similar bed purification means, cannot be effectively employed using $Mg(OH)_2$ or $MgO$ if the water has any significant concentration of carbonate (or bicarbonates). Initially there will be some adsorption of arsenic in the packed bed of $Mg(OH)_2$. However, eventually all of the $Mg(OH)_2$ will be converted to $MgCO_3$ because of the carbonate in the water, thereby rendering the bed useless for adsorbing arsenic (plus releasing any previous adsorbed arsenic on the $Mg(OH)_2$ prior to conversion to $MgCO_3$).

Carbonates typically present in arsenic-containing water, including bicarbonates, will also convert $Ca(OH)_2$ to $CaCO_3$. Upon such conversion to $CaCO_3$, arsenic adsorbed to $Ca(OH)_2$ desorbs and is released back into the water.

Consequently, reaction parameters must be controlled such that a maximal amount of arsenic is adsorbed, and then physically removed from the water, before the hydroxide is converted to the carbonate form (which does not adsorb arsenic, and releases arsenic).

The process of using $MgO$ or $Mg(OH)_2$ for arsenic removal can also be applied during water softening processes, where $CaO$, $Ca(OH)_2$ or $NaOH$ are added to cause precipitation of $CaCO_3$ from the water. The addition of $CaO$, $Ca(OH)_2$ or $NaOH$ is commonly used to treat hard water. Hence, $MgO$ or $Mg(OH)_2$ can also be added during the softening process to remove arsenic while the water is being softened. Since the carbonate is being removed by the addition of $CaO$, $Ca(OH)_2$ or $NaOH$, the $Mg(OH)_2$ will be stable and sorb arsenic. The arsenic-adsorbed $Mg(OH)_2$ may then be removed using any number of methods known in the art.

Because of the conversion of $Mg(OH)_2$ to $MgCO_3$ in the presence of water containing carbonates, the $Mg(OH)_2$ (with adsorbed arsenic) must be removed from the water before it is substantially reacted with carbonate in the water, where it would form $MgCO_3$ and concurrently release adsorbed arsenic.

A schematic of the process 10 is illustrated in FIG. 1. Arsenic contaminated water 12 is mixed with insoluble particles of either $MgO$ or $Mg(OH)_2$ 14 by injecting the particles into a flowing stream of water 12, optionally utilizing injector 18. The injector 18 may be a powder injector, if the $MgO$ or $Mg(OH)_2$ 14 is in powder form, or may a suspension injector if the $MgO$ or $Mg(OH)_2$ 14 is in a suspension. In general, the injector 18 controls the quantity of $MgO$ or $Mg(OH)_2$ 14 injected per volume of water, which is to say the concentration, and such injector may optionally contain automatic, computer-based or mechanical control mechanisms with respect to the release rate of $MgO$ or $Mg(OH)_2$ 14, the flow rate and pressure of water and the like. A holding tank 16 can be used, if necessary, to provide sufficient time for $Mg(OH)_2$ to adsorb the desired quantity of arsenic, without conversion of a significant quantity of $Mg(OH)_2$ to $MgCO_3$. In an alternative embodiment, no holding tank is provided, and a recycle stream, extended piping or other means is provided.

The length of time required for adsorption of the desired quantity of arsenic is dependent on a variety of factors, including pH and temperature of the water, quantity of arsenic present in the water and quantity of carbonates, including bicarbonates, present in the water. For most applications, the $Mg(OH)_2$ is maintained in the water for less than one hour, and preferably less than about thirty minutes. Following maintaining the particles of $Mg(OH)_2$ in contact with the arsenic contaminated water 12 for the desired time, the water transits by means of fluidic connection to separator 20. Separator 20 may include a filtration assembly, a vortex separator, a centrifugal separator, a combination of the foregoing, or any means for removal of insoluble particles of $Mg(OH)_2$ with adsorbed arsenic. In general, rapid removal of $Mg(OH)_2$ is desired, to prevent conversion of $Mg(OH)_2$ to $MgCO_3$ by native carbonates, and thus methods such as settling are not as effective unless carbonate concentrations are very low, or unless flocculating agents to aid in settling are employed. Following removal of $Mg(OH)_2$ with adsorbed arsenic 24, substantially arsenic-free, purified water 22 enters the water distribution system.

In removal methods employing settling, such as with $Mg(OH)_2$ or $Ca(OH)_2$, or a precursor thereto, a flocculating agent may be employed to aid in settling. Such agents increase the speed of settling, thereby permitting removal of, for example, $Mg(OH)_2$ prior to conversion to $MgCO_3$ due to the presence of $CaCO_3$ in the water. Various clays and polymers, known to those skilled in the art, may be employed to aid in settling of either $Mg(OH)_2$ or $Ca(OH)_2$ from water.

If the water to be treated contains a large amount of carbonate, then more $MgO$ or $Mg(OH)_2$ can be used to remove the arsenic. The presence of carbonate does not stop the adsorption of arsenic onto the $Mg(OH)_2$, but reduces the efficiency of the process of adsorption of arsenic, in part by conversion of $Mg(OH)_2$ to $MgCO_3$, and also by concomitant release of adsorbed arsenic.

In general, the adsorption of arsenic onto $Mg(OH)_2$ is a rapid reaction, and generally less than one minute of contact time is required. However, the rate of arsenic adsorption, as well as the rate for conversion of $Mg(OH)_2$ to $MgCO_3$, is temperature and pH dependent. At higher pH levels, the rate of formation of $MgCO_3$ is generally relatively decreased more than the rate of arsenic adsorption onto $Mg(OH)_2$, such that pH adjustment may be employed to insure arsenic adsorption without formation of magnesium carbonate overwhelming the arsenic adsorption.

$MgO$ will convert to $Mg(OH)_2$ upon adding to water. The reaction is pH and temperature dependent, and strongly depends on the crystallinity of the $MgO$ used. $MgO$ will hydrate to $Mg(OH)_2$ rapidly, within a few minutes, in water if the $MgO$ was originally prepared by heating to only a low temperature. $MgO$ prepared by heating to a low temperature is termed "reactive $MgO$". If the $MgO$ was prepared by heating to a high temperature (400 C-1500 C), a more crystalline material is formed. The highly crystalline form of $MgO$ can take days, weeks, or even months to convert to $Mg(OH)_2$. In the present invention, the use of "reactive $MgO$" is preferred because of the more rapid conversion to $Mg(OH)_2$. However, highly crystalline $MgO$ can be employed, particularly if it is first pretreated to decrease its crystallinity (which involves soaking in water that is heated to high temperature under high pressure). Either form of $MgO$ cost roughly the same.

Mg(OH)$_2$ is essentially insoluble in water over normal pH ranges and temperatures encountered in water distribution systems. Mg(OH)$_2$ is available, and may be employed in this invention, in any of a variety of suspensions, slurries, powders or particulates. In one embodiment, a magnesium hydroxide suspension is employed, containing at least 98% Mg(OH)$_2$ with a median particle size less than 3 microns, and preferably 0.5-1.0 microns, in a suspension of water. In another embodiment, Mg(OH)$_2$ powder may be employed, of a powder size sufficiently small to essentially all pass through a 325 mesh screen, and with a surface area from about 7 to about 13 m$^2$/gm.

A variety of techniques can be used to remove the Mg(OH)$_2$ after arsenic has adsorbed to its surface. The embodiment shown in FIG. 1 can be either a batch or continuous process. In a batch treatment method, a sufficient amount of MgO or Mg(OH)$_2$ is added to a container of water contaminated with arsenic. The Mg(OH)$_2$ is stirred to keep it in suspension for a sufficient period of time to adsorb the desired amount of arsenic.

Since Mg(OH)$_2$ has a K$_d$, or sorption coefficient defined as ((mole arsenic adsorbed/mole Mg(OH)$_2$)/mole/kg arsenic in water), equal to 1.1×10$^6$, a small amount of MgO or Mg(OH)$_2$ will treat a very large amount of arsenic contaminated water. Adding more than the minimum amount will serve to increase the rate at which the arsenic concentration decreases over time. This is shown in Tables 1 and 2. From Table 1, it was found that increasing the amount of Mg(OH)$_2$ five times (from 0.1 g/L to 0.5 g/L) decreased the final arsenic concentration by a factor of 10 (from 40 ppb to 4 ppb) during the same amount of contact time, 2 minutes. Likewise, Table 2 shows that adding twice as much MgO (from 0.05 g/L to 0.1 g/L) can reduce the time needed to reduce the arsenic concentration (in this example, by about 70%) from 30 minutes to 10 minutes. Table 2 also shows that adding 0.5 grams of MgO per liter of water, and stirring for 30 minutes, can provide a factor of 126 reduction in the arsenic concentration (e.g., from 126 ppb to 1 ppb). Accordingly, the concentration of MgO or Mg(OH)$_2$ added to water can vary, for example, from 0.001 g/L to 10 g/L, depending on how fast the arsenic needs to be adsorbed (i.e., the required contact time for a fixed concentration or the required final concentration for a fixed contact time, or both). Preferably, the concentration of MgO or Mg(OH)$_2$ added to water is between 0.1 g/L and 0.5 g/L Since Mg(OH)$_2$ is heavier than water, particles of Mg(OH)$_2$ with adsorbed arsenic will eventually settle out as a sludge on the bottom of a container of quiescent water. The settled particles can subsequently can be removed by draining them through a open valve in a bottom of the container, or by vacuuming out the sludge with a tube or hose, or by pouring out the water from the top without disturbing and re-suspending the settled particles. Flocculants can be added to enhance the settling action. Alternatively, the mixture can be kept in suspension, and then poured through a filter, whereby Mg(OH)$_2$ with adsorbed arsenic remains on the filter media and purified water passes through.

Alternatively, a dissolved air floatation apparatus can be used, whereby air (or other buoyant gas) is bubbled up from the bottom of a tank, whereby particles of Mg(OH)$_2$ with adsorbed arsenic attach to the gas bubbles and float to the top, where they can be skimmed off, leaving purified water behind.

Optionally, after separation and removal of Mg(OH)$_2$ with adsorbed arsenic 24 from the water, the pH of the purified water 22 can be adjusted appropriately, as needed.

Alternatively, the MgO or Mg(OH)$_2$ sorbent material can be coated onto a carrier or substrate particle, such as sand or glass microspheres. If the carrier particle is magnetic (such as containing iron), then magnetic separation can be used to efficiently and rapidly separate these particles of arsenic adsorbed on the Mg(OH)$_2$. If the carrier particle, including Mg(OH)$_2$ coating, is denser than water, then gravity can be used to settle and separate the particles. The larger the density difference with water, the more efficient the use of centrifugal and vortex separation processes. Alternatively, the carrier particle can be a lighter-than-water material (such as plastic or polystyrene microspheres), which would float to the surface where they can be easily skimmed off.

The separator can be a vortex separator, centrifugal separator or filter depending on the size of MgO/Mg(OH)$_2$ particles injected into the water stream to remove the arsenic. Additionally, a holding tank may optionally be included to provide the necessary contact time for the Mg(OH)$_2$ to remove the arsenic. A holding tank may not be needed for certain systems. A recycle stream can be substituted for the holding tank.

Other compounds may also be added to the system to increase the efficiency of Mg(OH)$_2$ arsenic adsorption. Compounds such as CaO and NaOH can be added to facilitate removal of carbonate, such that less MgCO$_3$ will form. In general, formation of MgCO$_3$ may be prevented or slowed by raising the pH of the water to be treated. Raising the pH also slows the adsorption of arsenic, but in general the rate of formation of MgCO$_3$ is more substantially slowed than is the rate of adsorption of arsenic, such that the system dynamics favor a net increase in the adsorption of arsenic.

The present invention is more economical than other arsenic removal systems. MgO has been approved for water treatment and is used for pH adjustment and in flocculation processes, and costs under $1,000 per ton. Magnesium is also beneficial for health reasons. In addition, the equipment for carrying out the process is inexpensive, requiring only a powder injector, small mixing tank, if required, and a separator. The total cost of a system for a million gallon a day water treatment plant is approximately one quarter or less the cost of conventional treatment processes for removal of arsenic.

Continuous Arsenic Removal System with Magnesium Recycling

Figure 2:
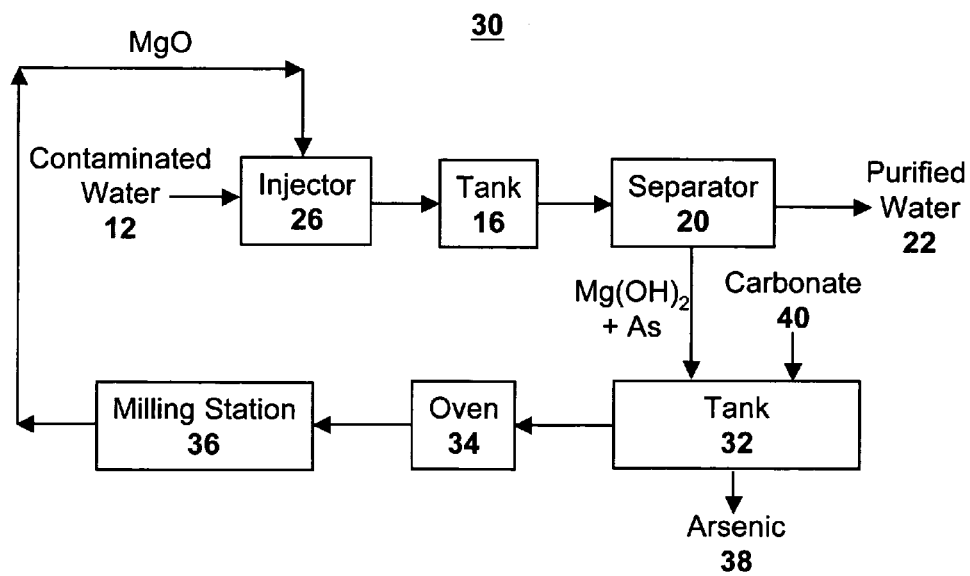
FIG. 2 is a schematic diagram of a process of the invention utilizing a MgO recycling scheme.

FIG. 2 illustrates an example of continuous arsenic removal system 30 with means for recycling the magnesium component of the system (e.g., as MgO). System 30 uses the reaction between Mg(OH)$_2$ and carbonate to produce purified MgO. Arsenic contaminated water 12 is mixed with insoluble particles of either MgO or Mg(OH)$_2$ 14 by injecting the particles into a flowing stream of water 12, optionally utilizing injector 18. The injector 18 may be a powder injector, if the MgO or Mg(OH)$_2$ 14 is in powder form, or may a suspension injector if the MgO or Mg(OH)$_2$ 14 is in a suspension. Injector 18 controls the quantity of MgO or Mg(OH)$_2$ 14 injected per volume of water. A holding tank 16 can be used, if necessary, to provide sufficient time for Mg(OH)$_2$ to adsorb the desired quantity of arsenic, without conversion of a significant quantity of Mg(OH)$_2$ to MgCO$_3$. In an alternative embodiment, no holding tank is provided, and a recycle stream, extended piping or other means is provided.

Following maintaining the particles of Mg(OH)$_2$ in contact with the arsenic contaminated water 12 for the desired time, the water transits by means of fluidic connection to separator 20. Separator 20 may include a filtration assembly, a vortex separator, a centrifugal separator, a combination of the foregoing, or any means for removal of insoluble particles of $Mg(OH)_2$ with adsorbed arsenic. Following removal of $Mg(OH)_2$ with adsorbed arsenic 24, substantially arsenic-free, purified water 22 enters the water distribution system.

The $Mg(OH)_2$ with adsorbed arsenic exits the separator 20 and enters a tank 32. Carbonate 40, such as sodium carbonate or sodium bicarbonate, or potassium carbonate or potassium bicarbonate, is introduced into tank 32, converting the $Mg(OH)_2$ to $MgCO_3$, and desorbing the arsenic into the aqueous solution. The arsenic is then removed in water stream 38. The $MgCO_3$ can be allowed to settle in tank 32, thereby permitting removal of arsenic in water stream 38 without concomitant removal of $MgCO_3$. Alternatively, the $MgCO_3$ can be filtered or otherwise separated from the water in tank 32.

The aqueous suspension of $MgCO_3$ is transferred by fluidic means to oven 34, wherein the water is evaporated and the resulting $MgCO_3$ without water is heated to about 400° C., whereby $CO_2$ is released, leaving MgO. The resulting substantially pure MgO may optimally be transported to a milling station 36, where the MgO is converted to a powder of desired size and screened as required. The resulting MgO powder is then moved by powder transport mechanisms to powder injector 26, wherein it is recycled and used again, as set for above. Therefore, the magnesium is recycled. In this sense, the magnesium acts like a catalyst.

It will be obvious to those skilled in the art that various combinations and permutations of the foregoing may be employed. In one such embodiment, the tank 32, oven 34 and milling station 36 may be combined in a single physical unit, and some components thereof, such as milling station 36, are only optionally employed. The resulting high arsenic concentration water stream 38 may be further concentrated, by evaporation or other means, and the resulting arsenic disposed of by means known to those skilled in the art. Alternatively, the arsenic may be purified and employed in industrial processes requiring arsenic.

Use of $Mg(OH)_2$ in Improving the Detection and Quantification of Arsenic $Mg(OH)_2$ can be used to in a process to concentrate arsenic in an aqueous sample for enhancing detection and quantification techniques for arsenic. The process is based on adding $Mg(OH)_2$, or MgO that converts to $Mg(OH)_2$ in water, to a first sample of contaminated water to be quantified for arsenic. After a determined time where the sample is mixed or stirred, preferably one hour or less, substantially all of the arsenic will be sorbed onto the particles of $Mg(OH)_2$. The solid $Mg(OH)_2$ with sorbed arsenic can then be separated and removed from the solution by filtration, centrifugation, or any other well-known separation step.

After separation and removal from the first sample, the $Mg(OH)_2$ with adsorbed arsenic is then mixed with a second sample of water (preferably water without arsenic), where the second sample has a smaller volume than that of the first sample. The second sample of water contains a carbonate or bicarbonate. The $Mg(OH)_2$ reacts with the carbonate in the second sample and converts to $MgCO_3$, whereupon arsenic is desorbed and released as free arsenic into the water. The smaller volume of the second sample now concentrates the free arsenic. A detection method, such as ion-coupled plasma mass spectroscopy, atomic absorbance spectroscopy, calorimetric, or other detection methods specific for arsenic, can then be used to quantify the amount of arsenic in the concentrated solution of the second sample, and a mathematical correction used to determine the actual concentration of arsenic in the first sample, based on the ratio of the volumes from the two water samples. The volume of the second sample, for example, can be 10% of the volume of the first sample, providing a concentration factor of 10×. Subsequently, the concentration of arsenic measured in the second sample is divided by 10 to produce the corrected, true concentration of the first sample.

The process inherently removes impurities in the first water sample that could adversely affect quantification. The process is similar to the above method of concentrating arsenic. MgO or $Mg(OH)_2$ is added to a first water sample to be analyzed for arsenic content. The arsenic adsorbs to the $Mg(OH)_2$. However, other ions such as fluoride, sulfate, selenium, antimony, and so on will not effectively adsorb to the $Mg(OH)_2$. The $Mg(OH)_2$ with adsorbed arsenic (but not other ions) is then added to a second sample of water, such as distilled water, containing added carbonate. The $Mg(OH)_2$ converts to $MgCO_3$, releasing free arsenic. The second sample contains only arsenic, the carbonate or bicarbonate, the balancing cation, such as potassium or sodium, and Mg at low levels. By effectively transferring only the arsenic from the first sample to be tested to a known quantity of water not containing arsenic, other metals, minerals or impurities in the original water sample, which might interfere with analytical assays, are effectively removed. This process can also employ a smaller volume of water in the second sample than was present in the first sample, thereby also concentrating the arsenic sample for quantification, without concurrent concentration of other impurities.

Use of Other Hydroxides

In addition to MgO, CaO can also be employed for arsenic concentration and removal. CaO and $Ca(OH)_2$ are strong sorbents for arsenic, but not as strong as MgO and $Mg(OH)_2$. Further, the rate of reaction with arsenic is not as fast as with $Mg(OH)_2$. However, acceptable results can be obtained with calcium hydroxides. Similar considerations exist with respect to carbonates, such that calcium hydroxide with adsorbed arsenic must be removed prior to conversion of any significant proportion of the calcium hydroxide to a calcium carbonate.

INDUSTRIAL APPLICABILITY

The invention is further illustrated by the following non-limiting examples.

EXAMPLE 1

Batch tests were performed by placing small quantities of $Mg(OH)_2$ in water with a known concentration of arsenic in the +5 oxidation state. The mixtures were shaken and samples were removed at varying time intervals. The results from batch tests with arsenic in deionized water spiked with additional arsenic is given in Table 1 below. The results show that $Mg(OH)_2$ strongly adsorbed arsenic from the water and that it can be used to remove arsenic from water in a water treatment process.

TABLE 1

Adsorption of Arsenic (As) from Deionized Water using $Mg(OH)_2$ after Two Minutes Contact Time

| $Mg(OH)_2$ added to 1 liter of water | Arsenic Initial Concentration (ppb) | Arsenic Final Concentration (ppb) |
|---|---|---|
| 0.1 g | 250 | 40 |
| 0.2 g | 250 | 22 |
| 0.5 g | 250 | 4 |

EXAMPLE 2

A second test was conducted as in Example 1 above, using MgO rather than Mg(HO)$_2$, utilizing tap water obtained from the water distribution system for the city of Albuquerque, N. Mex. This source of tap water contained a carbonate concentration of approximately 150 ppm (parts per million).

TABLE 2

Sorption of Arsenic (As) on MgO in Albuquerque Tap Water

| MgO in water (g/L) | Arsenic Initial (ppb) | Time, minutes | Arsenic Final (ppb) | % Arsenic Removed |
|---|---|---|---|---|
| 0.05 | 126 | 2 | 93.6 | 25.71 |
| 0.05 | 126 | 5 | 88.6 | 29.68 |
| 0.05 | 126 | 10 | 93.1 | 26.11 |
| 0.05 | 126 | 30 | 37.9 | 69.92 |
| 0.1 | 126 | 2 | 68.1 | 45.95 |
| 0.1 | 126 | 5 | 41.1 | 67.38 |
| 0.1 | 126 | 10 | 39.1 | 68.97 |
| 0.1 | 126 | 30 | 11.5 | 90.87 |
| 0.5 | 126 | 2 | 6.6 | 94.76 |
| 0.5 | 126 | 5 | 3.6 | 97.14 |
| 0.5 | 126 | 10 | 3.5 | 97.22 |
| 0.5 | 126 | 30 | 1 | 99.21 |

The results shown in Table 2 indicate that addition of 0.1 grams of Mg per liter of water causes a 91% reduction of the arsenic concentration after 30 minutes of contact time, from 126 ppb to 11.5 ppb. Also, Table 2 shows that addition of 0.5 grams of MgO per liter of water causes a 99% reduction of the arsenic concentration after 30 minutes of contact time, from 126 ppb to 1 ppb (which is well below the proposed EPA limit of 10 ppb).

In this experiment, measurements were subsequently taken of the amount of arsenic desorbed after sitting for 24 hours after the arsenic was initially sorbed. In all cases, only about 0.5 ppb of arsenic was desorbed after 24 hours, indicating that the complex comprising arsenic adsorbed on Mg(OH)$_2$ is stable for at least one day in water containing approximately 150 ppm of naturally occurring carbonate, which is much longer than the minimum time required to initially adsorb the arsenic (i.e., 30 minutes).

Additionally, samples of water containing arsenic adsorbed on Mg(OH)$_2$ were then artificially adjusted to have a very high concentration of carbonate, 0.1 M, by adding carbonate. Subsequently, approximately 90% of the adsorbed arsenic then desorbed, leaving a residual arsenic concentration of 110 ppb (as compared to the original level of 126 ppb). Presumably, this was due to conversion of Mg(OH)$_2$ to MgCO$_3$ (which does not bind arsenic), which released almost all of the adsorbed arsenic.

EXAMPLE 3

1 g of MgO was added to 1 L of water containing various initial concentrations of arsenic. The solution was filtered to remove the Mg(OH)$_2$ resulting from reaction of MgO with water. The filtered water was tested by ion-coupled plasma mass spectroscopy (I-C PMS), and had essentially no detectable arsenic. The filtrate, containing the Mg(OH)$_2$ resulting from reaction of MgO with water, was then added to a solution containing potassium bicarbonate in 100 mL of water. The potassium bicarbonate resulted in conversion of Mg(OH)$_2$ to MgCO$_3$, with concomitant desorption of the arsenic. This water was then tested for arsenic content, as shown in Table 3. This illustrates both that the arsenic was effectively concentrated by a factor of ten due to decrease in water concentration from 1 L to 100 mL, and that the initial 1 L of water, after filtration to remove Mg(OH)$_2$, was substantially pure with no detectable arsenic.

TABLE 3

Arsenic Concentrations determined by I-C PSM

| Initial Concentration of Arsenic in 1 L of Water | Arsenic Concentration of Filtrate in 100 mL of Water (with carbonate) |
|---|---|
| 10 ppb | 98 ppb |
| 30 ppb | 298 ppb |
| 50 ppb | 285 ppb |
| 100 ppb | 1001 ppb |

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. For example, the method of the present invention can be used with fluids other than water, including oil, gasoline, diesel, jet fuel, saltwater, and alcohol.

The entire disclosures of all references, applications, patents, and publications cited above are hereby incorporated by reference.

What is claimed is:

1. A continuous process for reducing the concentration of arsenic in water to below an acceptable level and for recycling magnesium, comprising:
    a) adding magnesium hydroxide to the water;
    b) adsorbing arsenic on the magnesium hydroxide;
    c) separating and removing from the water the magnesium hydroxide with adsorbed arsenic, thereby reducing the concentration of arsenic in the water to below the acceptable level;
    d) making an aqueous solution comprising the magnesium hydroxide with adsorbed arsenic removed in step c);
    e) converting the magnesium hydroxide with adsorbed arsenic to magnesium carbonate, whereupon free arsenic is released into the solution;
    f) separating and removing the magnesium carbonate from the solution;
    g) heating the magnesium carbonate to produce carbon dioxide and purified magnesium oxide; and
    h) providing the purified magnesium oxide produced in step g) to step a), whereby the magnesium is recycled.

2. The method of claim 1, wherein the magnesium hydroxide has a median particle size less than 3 microns.

3. The method of claim 2, wherein adding magnesium hydroxide to the water comprises adding magnesium oxide, which converts to magnesium hydroxide upon contact with the water.

4. The method of claim 3, wherein the magnesium oxide comprises reactive magnesium oxide.

5. The method of claim 3, wherein adding magnesium hydroxide to the water comprises adding 0.001-10 grams of MgO to each liter of water to be treated.

6. The method of claim 5, wherein adding magnesium hydroxide to the water comprises adding 0.1-0.5 grams of MgO to each liter of water to be treated.

7. The method of claim 2, wherein a sufficient amount of magnesium hydroxide is added to the water to reduce the concentration of arsenic to below an acceptable level of 10 ppb.

8. The method of claim 7, wherein a sufficient amount of magnesium hydroxide is added to the water to reduce the concentration of arsenic to below an acceptable level of 2 ppb.

9. The method of claim 2, wherein the water comprises wastewater from an industrial process.

10. The method of claim 2, wherein the water comprises potable water.

11. The method of claim 2, wherein the magnesium hydroxide is used in a form selected from the group consisting of a suspension, a slurry, a powder, and a particulate.

12. The method of claim 2, wherein the magnesium hydroxide has a median particle size of 0.5-1 microns.

13. The method of claim 2, wherein the magnesium hydroxide is used in the form of a powder having a surface area of 7-13 $m^2$/gram.

14. The method of claim 2, wherein adding magnesium hydroxide to the water comprises adding 0.001-10 grams of $Mg(OH)_2$ to each liter of water to be treated.

15. The method of claim 14, wherein adding magnesium hydroxide to the water comprises adding 0.1-0.5 grams of $Mg(OH)_2$ to each liter of water to be treated.

16. The method of claim 2, further comprising adjusting the pH of the water after separating and removing the magnesium hydroxide with adsorbed arsenic from the water.

17. The method of claim 1, wherein the step of adding magnesium hydroxide to the water comprises using a injector selected from the group consisting of a powder injector and a suspension injector to inject the magnesium hydroxide into a flowing stream of the water.

18. The method of claim 17, wherein adding magnesium hydroxide to the water comprises adding magnesium oxide, which converts to magnesium hydroxide upon contact with the water.

19. The method of claim 1, wherein the step of adsorbing arsenic on the magnesium hydroxide comprises maintaining the magnesium hydroxide in contact with the arsenic contaminated water for less than approximately one hour.

20. The method of claim 19, wherein the step of adsorbing arsenic on the magnesium hydroxide comprises maintaining the magnesium hydroxide in contact with the arsenic contaminated water for less than approximately thirty minutes.

21. The method of claim 20, wherein the step of adsorbing arsenic on the magnesium hydroxide comprises maintaining the magnesium hydroxide in contact with the arsenic contaminated water for approximately 2 minutes.

22. The method of claim 19, wherein the step of adsorbing arsenic on the magnesium hydroxide comprises stirring the mixture of water and magnesium hydroxide to keep the magnesium hydroxide in suspension for a period of time sufficient to adsorb a sufficient amount of arsenic.

23. The method of claim 19, wherein adding magnesium hydroxide to the water comprises adding magnesium oxide, which converts to magnesium hydroxide upon contact with the water.

24. The method of claim 1, wherein separating the magnesium hydroxide with adsorbed arsenic from the water comprises using a separation method selected from the group consisting of settling, skimming, vacuuming, draining, dissolved air flotation, vortex separating, centrifuging, and a combination of two or more of the foregoing.

25. The method of claim 24, wherein the separation method comprises settling using a flocculating agent to aid the settling process.

26. The method of claim 24, wherein adding magnesium hydroxide to the water comprises adding magnesium oxide, which converts to magnesium hydroxide upon contact with the water.

27. The method of claim 1, wherein the magnesium hydroxide is coated on the surface of a carrier particle.

28. The method of claim 27, wherein the carrier particle is lighter than water.

29. The method of claim 28, wherein the carrier particle comprises a particle selected from the group consisting of a plastic microsphere and a polystyrene microsphere.

30. The method of claim 27, wherein the carrier particle is heavier than water.

31. The method of claim 30, wherein the carrier particle comprises a particle selected from the group consisting of a sand particle and a glass microsphere.

32. The method of claim 27, wherein the carrier particle is magnetic.

33. The method of claim 32, further comprising magnetically separating the magnetic carrier particle from the water.

34. The method of claim 27, wherein adding magnesium hydroxide to the water comprises adding magnesium oxide, which converts to magnesium hydroxide upon contact with the water.

35. The method of claim 1,
wherein the $Mg(OH)_2$ is permitted to adsorb arsenic for a period of time;
wherein the period of time is greater than 2 minutes, which is sufficiently long to allow a sufficient amount of the arsenic to adsorb to $Mg(OH)_2$; and
wherein the period of time is less than 1 hour, which is sufficiently short to prevent significant release of the arsenic from the $Mg(OH)_2$ with adsorbed arsenic, due to conversion of $Mg(OH)_2$ to $MgCO_3$ by the carbonate in the water.

36. The method of claim 35, wherein the period of time is less than 30 minutes.

37. The method of claim 1, wherein the step of adsorbing arsenic on the magnesium hydroxide comprises increasing the pH level to decrease the rate of formation of $MgCO_3$.

38. The method of claim 1, further comprising the step of adding an inhibitor to inhibit conversion of magnesium hydroxide to magnesium carbonate.

39. The method of claim 38, wherein the inhibitor comprises a reagent selected from the group consisting of CaO and NaOH.

40. The method of claim 38, wherein the inhibitor increases the pH of the water.

41. The method of claim 1, wherein converting the magnesium hydroxide to magnesium carbonate in step e) comprises exposing the magnesium hydroxide with adsorbed arsenic to an aqueous solution comprising a reagent selected from the group consisting of sodium carbonate, sodium bicarbonate, potassium carbonate and potassium bicarbonate.

42. The method of claim 1, wherein the magnesium carbonate is heated in step g) to at least about 400 C.

43. The method of claim 1, further comprising converting the produced magnesium oxide to a powder of a desired size in-between step g) and h).

44. The method of claim 1, further comprising, after step e), removing arsenic from the solution comprising free arsenic, whereby purified arsenic is produced.

45. The method of claim 1, wherein adding magnesium hydroxide to the water comprises adding magnesium oxide, which converts to magnesium hydroxide upon contact with the water.

46. A method of concentrating arsenic from a sample of arsenic contaminated water, comprising:
  a) adding magnesium hydroxide to a first sample of the arsenic contaminated water;
  b) adsorbing arsenic on the magnesium hydroxide;
  c) separating and removing from the first sample the magnesium hydroxide with adsorbed arsenic;
  d) adding the magnesium hydroxide with adsorbed arsenic removed in step c) to a second sample of water, wherein the volume of liquid in the second sample is substantially less than the volume of liquid in the first sample; and
  e) converting the magnesium hydroxide with adsorbed arsenic in the second sample to magnesium carbonate, whereupon free arsenic is released into solution, whereby the concentration of free arsenic in the second sample is concentrated relative to the first sample by the ratio of the volume of liquid in the first sample divided by the volume of liquid in the second sample.

47. The method of claim 46, wherein the ratio of the volume of liquid in the first sample divided by the volume of liquid in the second sample is greater than or equal to 10.

48. The method of claim 46, further comprising measuring the concentration of arsenic in the second sample, and then dividing by the ratio of the volume of liquid in the first sample divided by the volume of liquid in the second sample, to produce the true concentration of arsenic in the first sample.

49. The method of claim 46, wherein step e) comprises adding to the second sample a carbonate reagent selected from the group consisting of sodium carbonate, sodium bicarbonate, potassium carbonate and potassium bicarbonate.

50. The method of claim 46, wherein adding magnesium hydroxide to the water comprises adding magnesium oxide, which converts to magnesium hydroxide upon contact with the water.

51. The method of claim 46, wherein the second sample of water comprises essentially no arsenic.

52. A method of concentrating arsenic from a sample of water contaminated with arsenic and at least one other impurity, comprising:
  a) adding magnesium hydroxide to a first sample of the contaminated water;
  b) adsorbing arsenic on the magnesium hydroxide;
  c) separating and removing from the first sample the magnesium hydroxide with adsorbed arsenic;
  d) adding the magnesium hydroxide with adsorbed arsenic removed in step c) to a second sample of water, wherein the volume of liquid in the second sample is substantially less than the volume of liquid in the first sample, and wherein the water in the second sample consists of essentially pure water without arsenic or other impurities; and
  e) converting the magnesium hydroxide with adsorbed arsenic in the second sample to magnesium carbonate;
  whereupon free arsenic is released into solution;
  whereby the concentration of free arsenic in the second sample is concentrated relative to the first sample by the ratio of the volume of liquid in the first sample divided by the volume of liquid in the second sample;
  and further wherein the at least one impurity in the first sample is not transferred to the second sample.

53. The method of claim 52, wherein the ratio of the volume of liquid in the first sample divided by the volume of liquid in the second sample is greater than or equal to 10.

54. The method of claim 52, further comprising measuring the concentration of arsenic in the second sample, and then dividing by the ratio of the volume of liquid in the first sample divided by the volume of liquid in the second sample, to produce the true concentration of arsenic in the first sample.

55. The method of claim 54, wherein measuring the concentration of arsenic in the second sample comprises performing ion-coupled plasma mass spectrometry on the second sample.

56. The method of claim 52, wherein step e) comprises adding to the second sample a carbonate reagent selected from the group consisting of sodium carbonate, sodium bicarbonate, potassium carbonate and potassium bicarbonate.

57. The method of claim 52, wherein the water in the second sample of water is distilled water.

58. The method of claim 52, wherein adding magnesium hydroxide to the water comprises adding magnesium oxide, which converts to magnesium hydroxide upon contact with the water.

* * * * *